United States Patent [19]
Edsall

[11] Patent Number: 5,764,636
[45] Date of Patent: Jun. 9, 1998

[54] COLOR BLOCKING LOGIC MECHANISM FOR A HIGH-PERFORMANCE NETWORK SWITCH

[75] Inventor: Tom Edsall, Mountain View, Calif.

[73] Assignee: Cisco Technology, Inc., San Jose, Calif.

[21] Appl. No.: 620,788

[22] Filed: Mar. 28, 1996

[51] Int. Cl.[6] .................................................. H04L 12/28
[52] U.S. Cl. ........................... 370/401; 370/256; 370/400
[58] Field of Search ...................................... 370/255, 256, 370/257, 400, 401, 402, 425, 426, 386, 392, 404, 406, 408

[56] References Cited

U.S. PATENT DOCUMENTS

| | | | |
|---|---|---|---|
| 4,597,078 | 6/1986 | Kempf | 370/401 |
| 4,627,052 | 12/1986 | Hoare et al. | 370/402 |
| 4,823,338 | 4/1989 | Chan et al. | 370/522 |
| 5,280,480 | 1/1994 | Pitt et al. | 370/85.13 |
| 5,394,402 | 2/1995 | Ross | 370/94.1 |
| 5,490,252 | 2/1996 | Macera et al. | 370/404 |
| 5,606,669 | 2/1997 | Bertin et al. | 395/200.15 |

*Primary Examiner*—Wellington Chin
*Assistant Examiner*—Soon-Dong Hyun
*Attorney, Agent, or Firm*—Cesari and McKenna, LLP

[57] ABSTRACT

A color blocking logic (CBL) mechanism implements spanning tree states with respect to data frames transported between port interface circuitry over a link connecting different switches in a network. Each port interface circuit preferably supports multiple virtual local area network (VLAN) designations and associates those VLAN designations with data frames transmitted to and from the switch over the link. The CBL mechanism cooperates with a forwarding engine of the switch to selectively enable the port interface circuit to receive certain VLAN-designated frames, and to discard others, in an efficient and cost-effective manner.

20 Claims, 7 Drawing Sheets

COLOR BLOCKING LOGIC MECHANISM FOR A HIGH-PERFORMANCE NETWORK SWITCH

CROSS-REFERENCE TO RELATED APPLICATIONS

This invention is related to the following copending U.S. Patent Applications:

U.S. Pat. application Ser. No. 08/621,720 titled, ARCHITECTURE FOR AN EXPANDABLE TRANSACTION-BASED SWITCHING BUS;

U.S. Pat. application Ser. No. 08/621,718 titled, ADDRESS TRANSLATION MECHANISM FOR A HIGH-PERFORMANCE NETWORK SWITCH; and U.S. Pat. Application Ser. No. 08/823,142 titled, INTERSWITCH LINK MECHANISM FOR CONNECTING HIGH-PERFORMANCE NETWORK SWITCHES, each of which was filed on even date herewith and assigned to the assignee of the present invention.

FIELD OF THE INVENTION

This invention relates generally to network switches and, more specifically, to an arrangement for efficiently regulating virtual local area network traffic between switches in a data communications network.

BACKGROUND OF THE INVENTION

A network switch of a data communications network provides a "switching" function for transferring information, such as data frames, among entities of the network. Typically, the switch is a computer comprising a collection of components (e.g., cards) interconnected by a backplane of wires. Each card may include a plurality of ports that couple the switch to the other network entities over various types of media, such as Ethernet, FDDI or token ring connections. A network entity may consist of any device that "sources" (i.e., transmits) or "sinks" (i.e., receives) frames over such media.

The switching function provided by the switch typically comprises receiving data at a source port from a network entity, transferring the data over the backplane to at least one other destination port and, thereafter, transmitting that data over at least one medium to another entity of the network. Often, the destination of a data frame may be more than one, but less than all of the ports of the switch; this type of multicast data transfer is typically employed to segregate communication between groups of entities on a network. An arrangement that is capable of associating any port of a hub with any particular segregated network group is disclosed in U.S. Pat. No. 5,394,402, issued on Feb. 28, 1995 to Floyd E. Ross. According to this patent, any number of physical ports may be associated with any number of groups within the hub using a virtual local area network (VLAN) arrangement that virtually associates the port with a particular VLAN designation.

Specifically, Ross discloses a hub for a segmented virtual local area network with shared media access that associates VLAN designations with at least one internal port and further associates those VLAN designations with messages transmitted from any of the ports to which the VLAN designation has been assigned. The VLAN designation for each internal port is stored in a memory portion of the hub such that, every time a message is received by the hub on an internal port, the VLAN designation of that port is associated with the message. Association is accomplished by a flow processing element which looks up the VLAN designation in a respective memory portion based on the number of the internal port where the message originated.

In many cases, it may be desirable to interconnect a plurality of switches in order to extend the VLAN associations of ports in the network; furthermore, it may be desirable to interconnect the switches using a mechanism that supports multiple VLAN designations among each port and link coupling the switches. Such an interswitch link (ISL) mechanism is disclosed in copending and commonly assigned U.S. Pat. application Ser. No. 08/623,142 titled, Interswitch Link Mechanism for Connecting High-Performance Network Switches, which application is hereby incorporated by reference as though fully set forth herein.

A potential issue, however, with such a mechanism involves the formation of "loops". FIG. 1 depicts an arrangement 100 for interconnecting a plurality of network switches wherein switch 102s is coupled to switch 102d by way of an external LAN-type link 125, e.g., through "blue" (13) VLAN ports of the switches, and via an ISL link 110. Because the ISL link 110 and its corresponding ISL port interface circuitry 120s and 120d support multiple VLAN designations, the B VLAN-related traffic may be transferred over both links thereby forming a loop. A conventional spanning tree algorithm may be employed by the switches to "sever" one of the links with respect to the B VLAN traffic using special messages called bridge protocol data unit (BPDU) frames. The spanning tree algorithm and BPDU messages are well-known and documented (see IEEE Standard 802.1 D); as a result, only an overview of their operation will be discussed.

Broadly stated, switches exchange BPDU frames in order to calculate a spanning tree, which is a subset of the network that includes the switches but contains no loops. The BPDU frames contain sufficient information, such as the relative cost of transmitting data frames over the links, needed by the switches to dynamically discover a loop-free tree. Using this information, the switches calculate the tree in accordance with the algorithm and, as a result of computed spanning tree states, may elect to include the external LAN link and its ports in the spanning tree to the exclusion of the ISL link.

Accordingly, the external LAN link's corresponding ports are placed in a forwarding spanning tree state within the switches so that data frames may be forwarded to and from those ports, whereas traffic over the ISL link is essentially severed; that is, the ISL link's corresponding ports are placed in a blocking spanning tree state and the switches do not forward data frames to and from those ports. This, in turn, raises the problem of blocking certain VLAN traffic over the ISL link while still forwarding other VLAN "color" traffic over that link.

A solution to this problem may be to regulate the VLAN color traffic on the link using a dedicated register in the ISL port interface circuitry for each VLAN designation associated with that port. However, this approach is impractical for a switch architecture that supports a significant number (e.g., 1000) of VLANs because of the substantial amount of real estate that the registers would consume on the circuits and cards. Moreover, for a port that supports multiple VLAN designations, the appropriate spanning tree state cannot be determined until a frame is received at that port.

Therefore, the invention is directed to an efficient and cost-effective mechanism for dynamically implementing spanning tree states such that certain color traffic may be blocked over a link capable of supporting multiple VLAN color designations, while other VLAN color traffic may be forwarded over that link.

SUMMARY OF THE INVENTION

Briefly, the invention comprises a color blocking logic (CBL) mechanism for dynamically implementing spanning tree states with respect to data frames transported between port interface circuitry over a link connecting different switches in a network. Each port interface circuit preferably supports multiple virtual local area network (VLAN) designations and associates those VLAN designations with data frames transmitted to and from the switch over the link. The CBL mechanism cooperates with a forwarding engine of the switch to selectively enable the port interface circuit to receive certain VLAN-designated frames, and to discard others, in an efficient and cost-effective manner.

In the illustrative embodiment, the CBL mechanism is associated with an interswitch link (ISL) port interface circuit and comprises a state machine coupled to a port state decoder via a memory table. These elements interact to transform certain information contained in a data frame received at the ISL port interface circuit to signals used by the forwarding engine and the interface circuit when executing forwarding decisions for that frame. As a result, VLAN traffic may be regulated on a per port basis for those ports capable of supporting multiple VLAN designations.

Specifically, the contents of VLAN and bridge protocol data unit (BPDU) fields of a frame are parsed by the state machine and concatenated to form an address for accessing the memory table. The table comprises a plurality of entries, each of which contains a binary-encoded value representing one of five spanning tree states of the port for each VLAN designation: forwarding, learning, blocking, listening and disabling. The contents of the addressed entry are provided to the decoder which generates control signals corresponding to the proper spanning tree state. These control signals are then provided to the forwarding engine and ISL port interface circuit to, inter alia, enable/disable the port interface circuit with respect to receiving the frame.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF ILLUSTRATIVE EMBODIMENT

Figure 1:
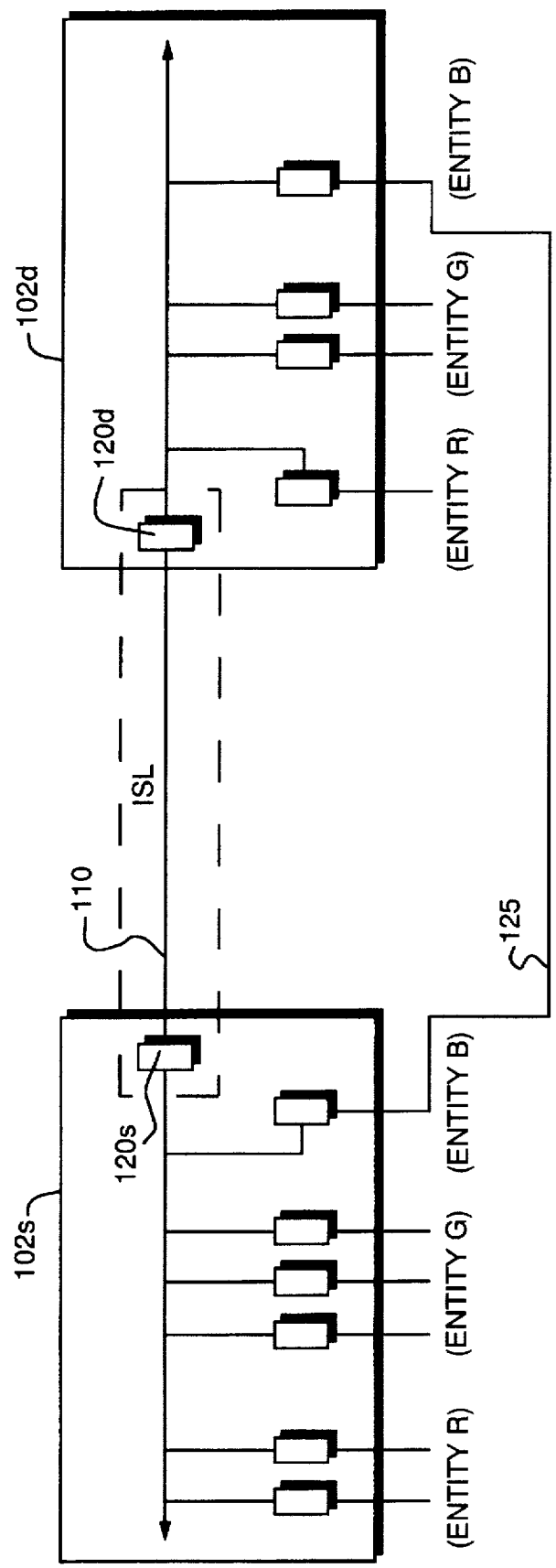
FIG. 1 is a block diagram depicting an arrangement for interconnecting a plurality of switches in a data communications network.
Figure 2:
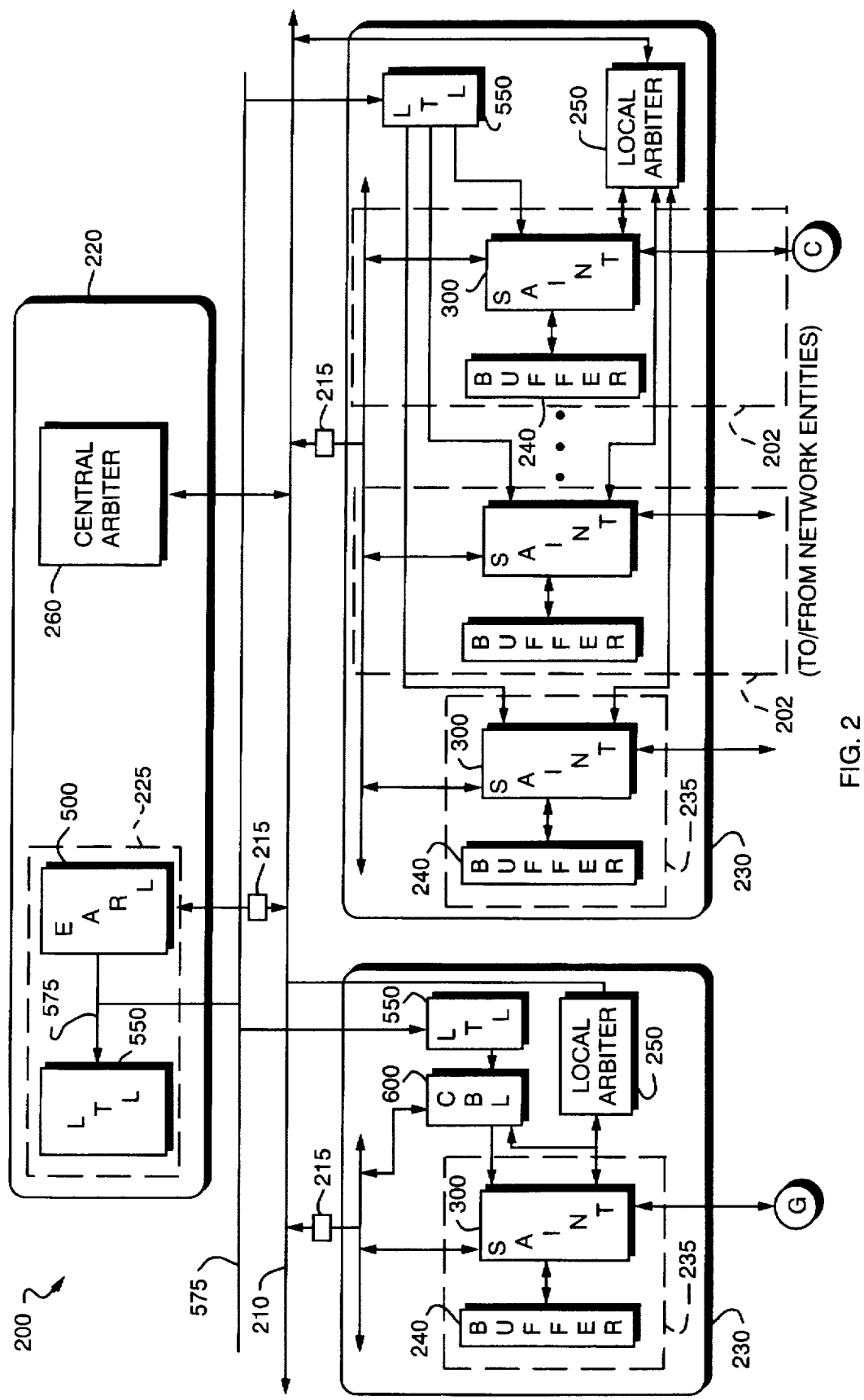
FIG. 2 is a schematic block diagram of a network switch comprising a high-performance switching bus for interconnecting ports that may be advantageously used with the present invention.

FIG. 2 is a schematic block diagram of a network switch 200 comprising a high-performance switching bus 210 for interconnecting ports 202 that couple the switch to network entities of a data communications network. The ports may be implemented on various cards of the switch, including a supervisor card 220 and a plurality of line cards 230. Each line card may have as many as 64 ports situated thereon, while the supervisor card may contain no ports. Communication among the ports/cards occurs synchronously over the switching bus 210 using periodic bus cycles. The switching bus is preferably a 48-bit bus having a bus cycle of 40 nsecs (25 Mhz) and an effective data rate of 1.2 Gb/s.

The architecture of the switching bus is preferably implemented as forwarding engine circuitry 225 and port interface circuitry 235 that cooperate to efficiently transmit data to, and receive data from, the switching bus 210. The forwarding engine 225 is located on the supervisor card 220 and comprises an encoded address recognition logic (EARL) circuit 500 coupled to a local target logic (LTL) circuit 550 over a result bus 575. Functionally, the EARL 500 executes all forwarding decisions for the switch 200, while the LTL 550, in conjunction with color blocking logic (CBL) circuit 600, implements those forwarding decisions by selecting ports as destinations for receiving data frames transferred over the switching bus 210. As can be seen in FIG. 2, the LTL may be distributed among the cards of the switch via the result bus 575.

Each port 202 of the switch is controlled by port interface circuitry 235 comprising a synchronous advanced interface network termination (SAINT) circuit 300 coupled to a frame buffer 240, which is preferably a first-in, first out (FIFO) memory. The SAINT 300 provides media access control (MAC) and direct memory access (DMA) capabilities for the switch 200. Specifically, the DMA capability provides buffer management of the buffer 240 and an interface to the switching bus 210, while the MAC capability allows attachment of the switch 200 to a network entity. The network entity may comprise a processor or similar circuit that interfaces with network media, such as Ethernet, FDDI or token ring connections.

In the illustrative embodiment, a buffer circuit 215 connects each card to the switching bus 210. This circuit 215 is located on the switching bus 210 and provides a single clock (i.e., 40 nsec) delay between the bus and each port 202 on the card. Such clock cycle delay maintains proper loading on the backplane so that data transmitted from the ports can be properly driven onto the bus.

Efficiency of data transfer within the switch is further realized in accordance with a 2-tier arbitration policy that ensures adequate port access to the switching bus 210. Arbitration consists of interaction between a central arbiter 260 and a local arbiter 250 contained on each card of the switch 200. The central arbiter is located on the supervisor card 220 and can preferably support as many as thirteen line cards, while each local arbiter can support up to twenty-four ports. An example of such a 2-tier arbitration policy is provided in copending and commonly assigned U.S. Patent Application titled Architecture for an Expandable Transaction-Based Switching Bus, filed on even date herewith, which application is incorporated by reference as though fully set forth herein.

Figure 3:
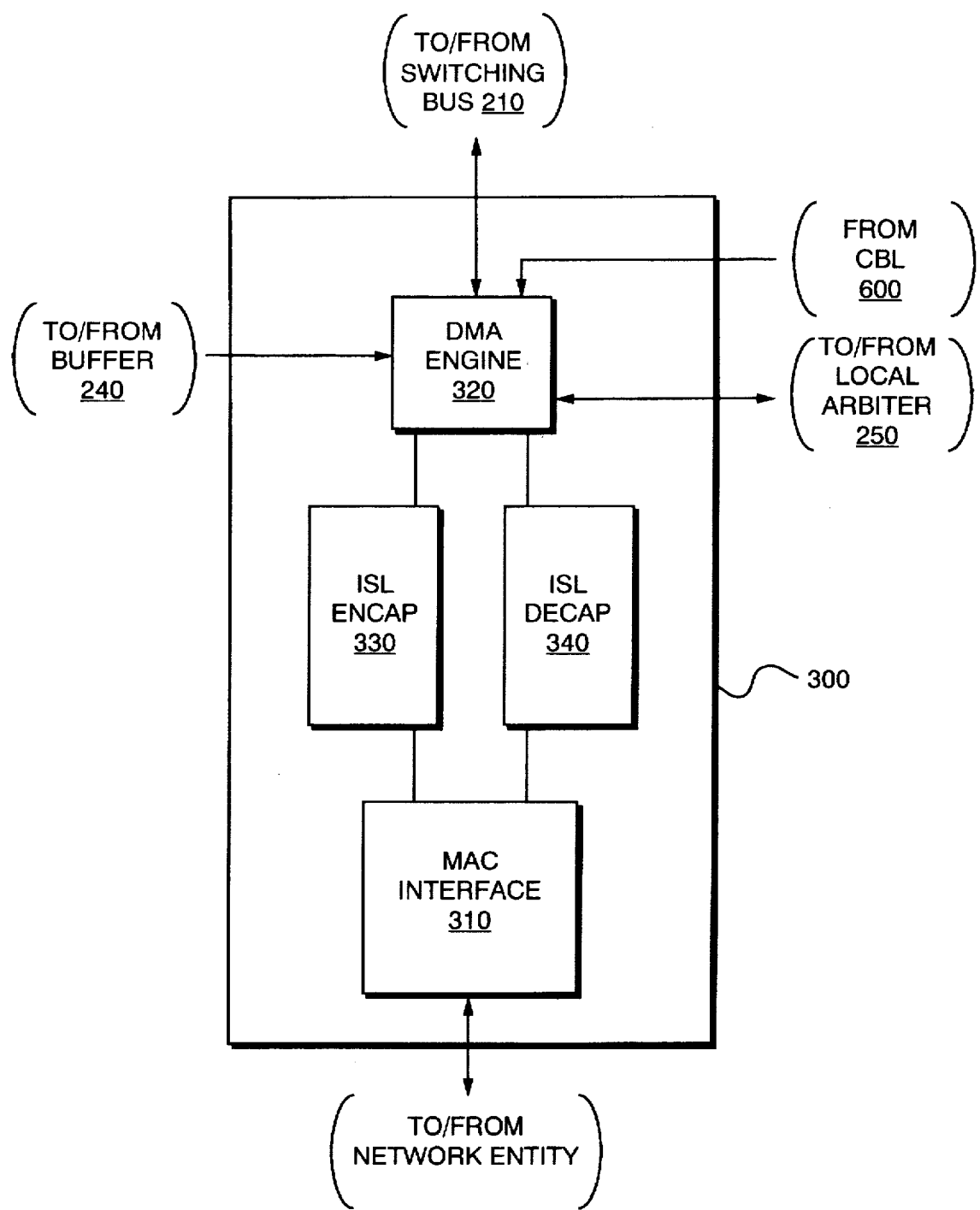
FIG. 3 is a schematic block diagram of a port interface circuit for controlling transfer of data frames associated with each port of the switch.

FIG. 3 is a schematic block diagram of the port interface circuitry 235 and, in particular, the SAINT circuit 300. This circuit is primarily responsible for (i) receiving data frames from the network and passing them to the switching bus, and (ii) receiving frames from the switching bus and passing them to the network. In order to efficiently discharge these responsibilities, the SAINT is configured to transmit and receive frame data at "wire" speed (e.g., 10 to 100 Mb/s) over the network independent of frame size, while simultaneously sourcing data to or sinking data from the switching bus 210.

In the illustrative embodiment, the SAINT 300 comprises a MAC interface circuit 310 coupled to a DMA engine 320 by way of interswitch link (ISL) encapsulation (ENCAP) and de-encapsulation (RECAP) circuits 330 and 340. These latter circuits cooperate to provide an improved encapsulation mechanism for efficiently transporting frames between ports of different switches in a network on the basis of, inter alia, virtual local area network (VLAN) associations among those ports. The MAC interface 310, on the other hand, provides an IEEE 802.3 MAC service layer for moving the frames to and from the network, while the DMA engine 320 moves frames between the buffer 240 and the MAC interface 310, and between the buffer 240 and switching bus 210. The DMA engine also modifies each frame by appending header information to it prior to arbitrating for access to the switching bus.

Figure 4:
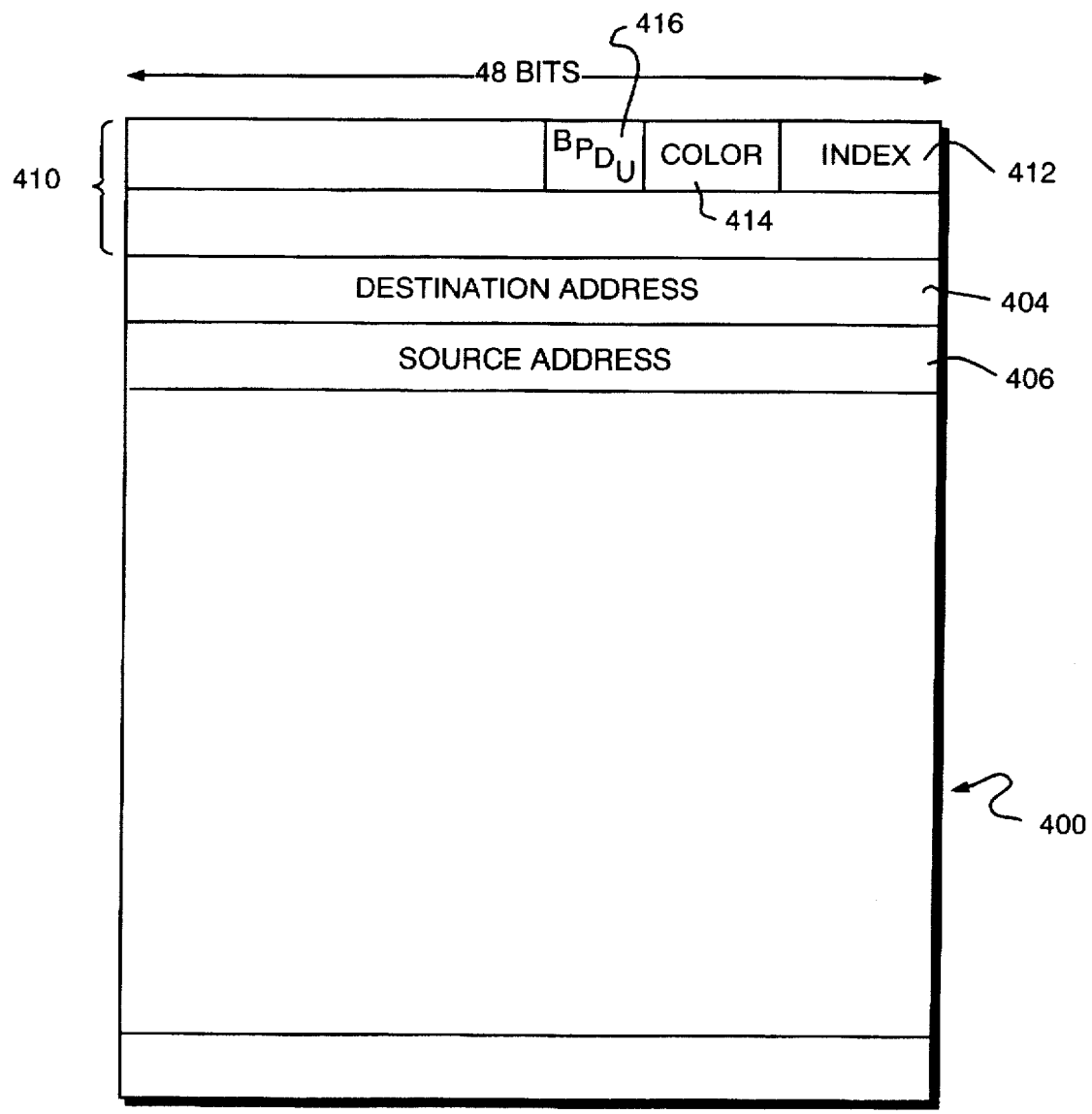
FIG. 4 is a block diagram illustrating the format of a data frame modified by the port interface circuit of FIG. 3.

FIG. 4 illustrates the format of a modified data frame 400. When received at the port, the frame contains a 48-bit destination address in field 404 that identifies the destination network address of the frame and a 48-bit source address in field 406 identifying the source network address of the frame; the DMA engine 320 of SAINT 300 then appends two 48-bit headers 410 to the frame 400. Of interest to the present invention are a unique index value loaded into a 10-bit index field 412, a virtual local area network (VLAN) "color" identifier loaded into a 10-bit color field 414 and a bridge protocol data unit (BPDU) bit loaded into field 416 by the engine. The index value represents the source index of the port transferring the frame over the switching bus 210, whereas the BPDU bit identifies the particular type of frame. The DMA engine 320 examines the destination address of a frame received by the MAC interface from the network and if that address constitutes a defined BPDU (e.g., a reserved MAC) address, the BPDU bit is asserted in the header.

A VLAN identifier is associated with each port of the switch to facilitate segregating of communication among network entitites coupled to the ports of the switch. An example of an arrangement suitable for use with the present invention for virtually associating any number of physical ports with any number of entity groups is disclosed in U.S. Pat. No. 5,394,402, issued on Feb. 28, 1995 to Floyd E. Ross and titled Hub for Segmented Virtual Local Area Network with Shared Media Access, which patent is incorporated by reference as though fully set forth herein.

Referring again to FIGS. 2 and 3, upon acquiring access to the bus, the DMA engine 320 drives its data frame through the connecting buffer circuit and onto the switching bus 210. Each card coupled to the switching bus accepts the frame and its port interface circuitry begins storing it in the respective frame buffer 240 independent of the actual destination of the frame. All of the wires of the switching bus 210 are used for transferring the contents of the frame so that 48-bits of data are driven onto the bus at each 40 nsec clock cycle; this continues until the entire contents of the frame are transmitted over the bus and loaded into the buffer of each port interface by the DMA engine.

Figure 5:
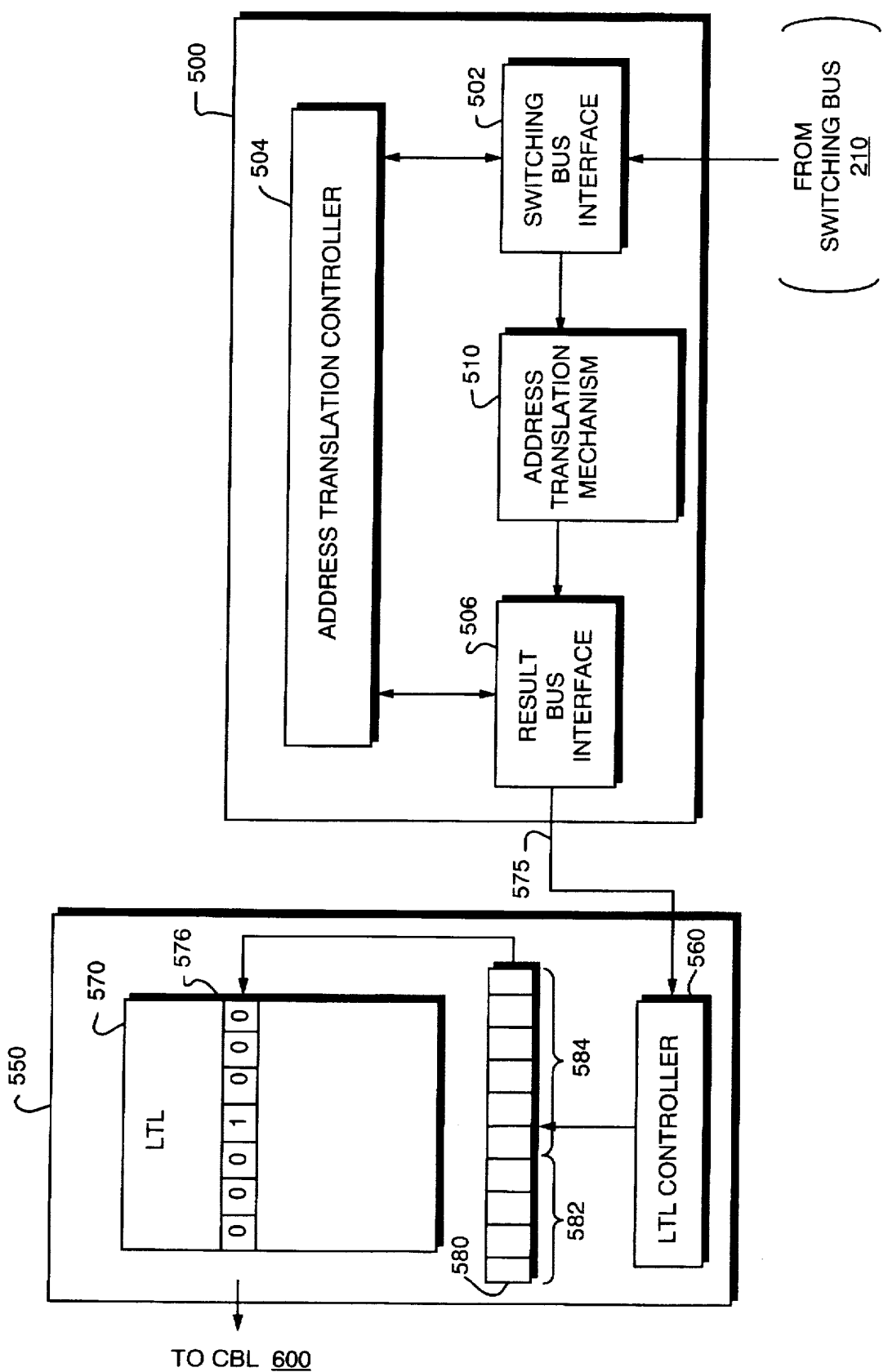
Fig. 5 is a schematic block diagram of a forwarding engine circuit that determines the destination of data frames transferred over the switching bus.

At the supervisor card 220, the forwarding engine circuitry 225 also accepts the frame, but only examines a portion of the header contents to determine the destination of the data. FIG. 5 is a schematic block diagram of the forwarding engine 225 and, in particular, the EARL 500 and LTL 550. The EARL generates a unique index for each frame it receives over the switching bus in response to the frame's VLAN identifier and destination address. In order to generate this index, the EARL employs an address translation mechanism that essentially maps the frame's destination address and VLAN identifier to a destination port using forwarding tables that contain, inter alia, a unique index value assigned to each port in the switch.

Specifically, EARL 500 receives the frame at a switching bus interface circuit 502 which, under control of an address translation controller 504, parses the frame to extract the destination address (DA), source address (SA) and VLAN identifier. The DA address is provided to the address translation mechanism 510 to produce a unique destination index value 580; essentially, the address translation mechanism maps the destination address of the frame to the unique index of a port. Upon resolving the destination of the frame, the index value is driven over the result bus 575 by a result bus interface circuit 506 where it is received by LTL 550.

The index 580 is preferably a 10-bit value comprising a 4-bit slot number field 582 and a 6-bit port number field 584. The 4-bit slot number field 582 allows addressing of sixteen (16) unique slots in the switch, whereas the 6-bit port number field 584 can address sixty-four (64) ports for each particular slot. Collectively, these fields provide a unique 10-bit index for each of one thousand (1000) ports of switch 200; however, it will be understood to those skilled in the art that other index field configurations (e.g., a 16-bit index) may be provided to address additional ports.

An LTL controller 560 of the LTL 550 receives the index from the result bus 575 and uses it to address a location of a store unit 570. The store unit comprises a plurality of locations 576, each of which contains a series of binary-coded values corresponding to specific ports of the switch. That is, the binary-coded values effectively translate the unique index to a port select signal that identifies the destination of the data frame. Examples of address translation and LTL mechanisms suitable for use with the present invention are provided in copending and commonly assigned U.S. Patent Application titled Address Translation Mechanism for a High-Performance Network Switch, filed on even date herewith, which application is incorporated by reference as though fully set forth herein.

CBL Mechanism

As noted, it may be desirable to interconnect a plurality of switches in order to extend the VLAN associations of ports in the network and further, to interconnect the switches using a mechanism that supports multiple VLAN designations among each port and link coupling the switches. The ISL mechanism referred to in the previously incorporated U.S. Pat. application Ser. No. (112025-0015) titled, Interswitch Link Mechanism for Connecting High-Performance Network Switches, discloses an ISL link and corresponding ISL port interface circuitry that support multiple VLAN designations. However, use of the ISL mechanism may result in the formation of loops with respect to certain VLAN traffic in the network and the present invention is directed to a mechanism for regulating VLAN traffic over the ISL link.

In accordance with the invention, a color blocking logic (CBL) mechanism is provided for dynamically implementing spanning tree states with respect to VLAN data frames transported between ISL port interface circuitry over the ISL link. As described herein, the CBL mechanism cooperates with the forwarding engine circuitry 225 to selectively enable the port interface circuitry to receive certain VLAN-designated frames, and to discard others, in an efficient and cost-effective manner.

Figure 6:
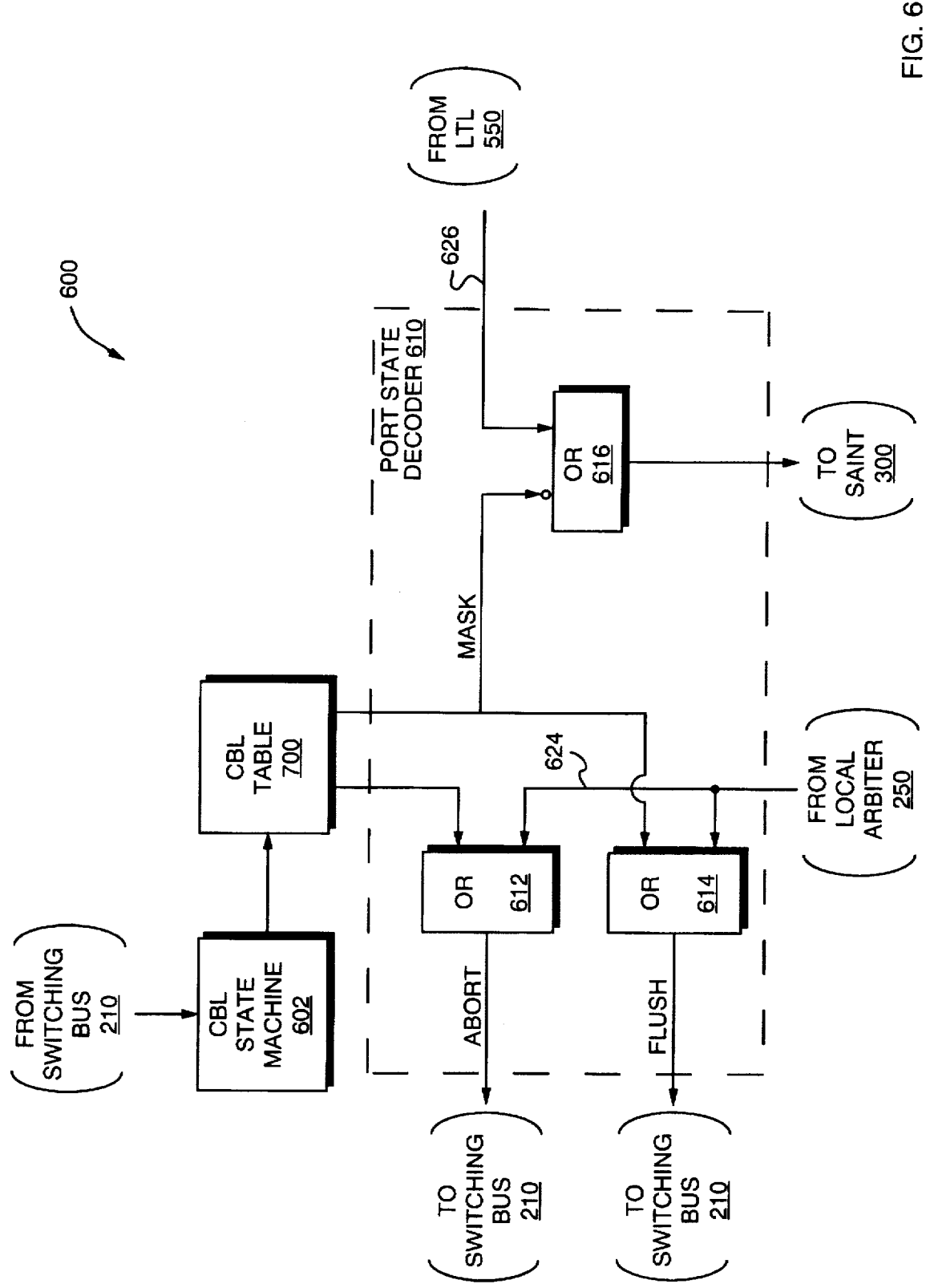
FIG. 6 is a schematic block diagram of a color blocking logic (CBL) mechanism comprising a CBL state machine coupled to a port state decoder via a CBL table in accordance with the invention.

FIG. 6 is a schematic block diagram of the CBL mechanism 600 comprising a CBL state machine 602 coupled to a port state decoder circuit 610 via a CBL table 700. In the illustrative embodiment, the CBL mechanism is preferably associated with an ISL port interface circuit, although it will be understood to those skilled in the art that the teachings herein may be extended to associate the novel mechanism with any port interface circuit 235 of the switch 200. These elements of the mechanism 600 interact to transform certain information contained in a data frame 400 to signals used by the forwarding engine 225 and port interface circuitry 235 when executing forwarding decisions for those frames.

Figure 7:
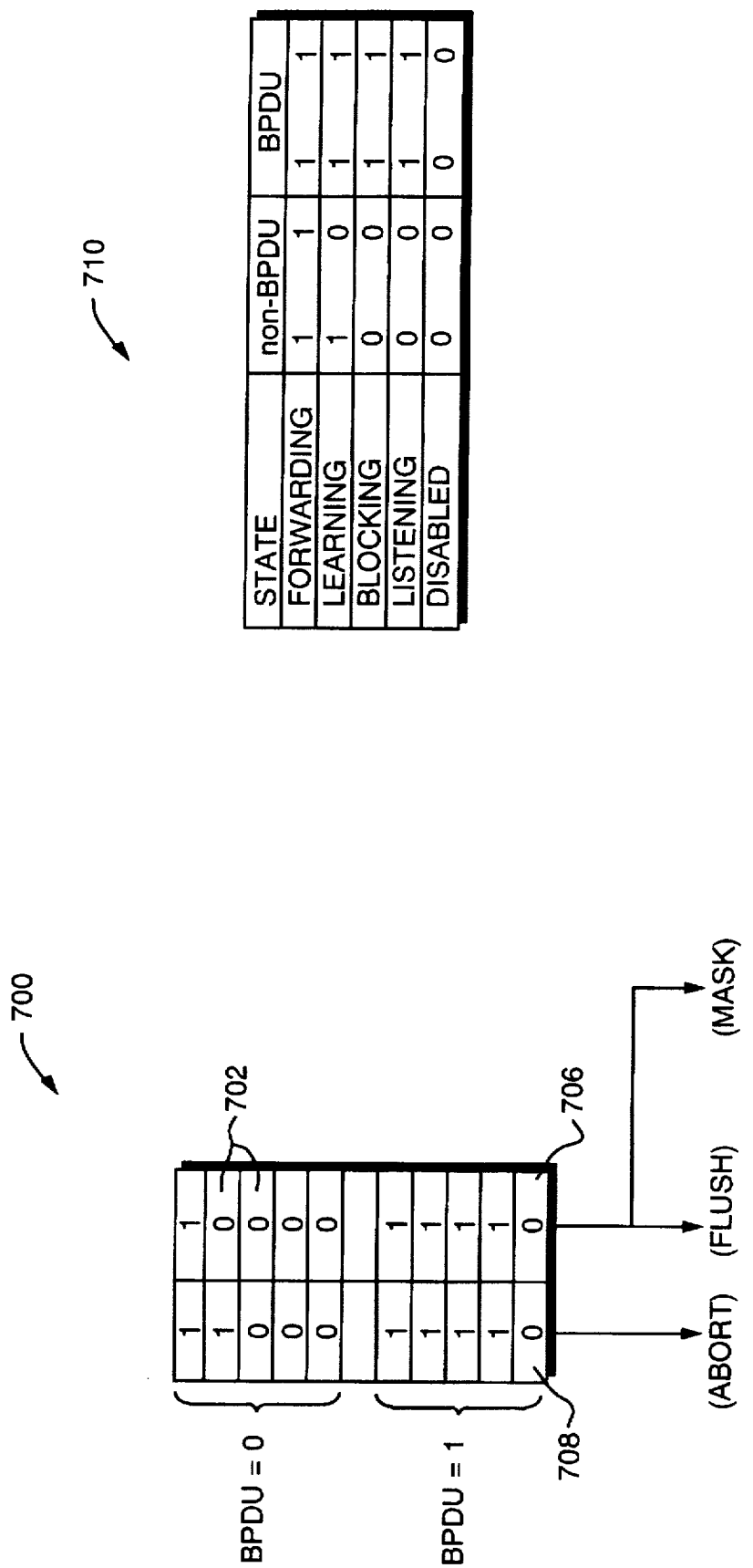
FIG. 7 is a schematic block diagram of the CBL table of FIG. 6 in accordance with the present invention.

Specifically, the contents of the VLAN ("color") field 414 and BPDU field 416 are extracted by the CBL state machine 602 from a frame 400 transmitted over the switching bus 210 and those contents are concatenated to form an address for accessing the CBL table 700. FIG. 7 is a schematic block diagram of the CBL table 700 which is preferably a random access memory (RAM) device having a plurality of entries 702. In the illustrative embodiment, the table has a column for every port in the switch and each entry 702 of the column is preferably two (2) bits wide. A processor (not shown) programs each entry of the table according to a current spanning tree state of the port for each VLAN designation; a different spanning state is preferably provided for each VLAN designation of the port. Notably, the BPDU bit is the most significant bit of the concatenated address into the table and thus effectively divides the table into 2 halves depending upon its state (e.g., BPDU=0,BPDU=1).

Each entry 702 of table 700 contains a binary-encoded value representing one of five spanning tree states of the port for each VLAN designation; as shown in state table 710, these spanning tree states include (the signals are preferably active low): forwarding"1111", learning"1011", blocking"0011", listening"0011" and disabling"0000". Note that the blocking and listening states appear the same from the point of view of the CBL; the difference is that the processor generates a BPDU frame for transmission from the port in one state and not the other.

In general, all frames are passed normally through the port during the forwarding state, whereas in the learning state, all frames are received by the switch 200 and"learned" by EARL 500; however, only BPDU frames are forwarded to other ports of the switch. In the blocking state, all frames are received by the switch and only BPDU frames are forwarded to other ports, but the received frames are not learned by EARL. The listening state is similar to the blocking state in that BPDU frames may be transmitted among the ports of the switch, whereas for the disabling state, no frames are received at the switch.

The contents of the addressed entry 702 are provided to the port state decoder 610 which comprises an arrangement of logic gates configured to generate various control signals corresponding to the proper spanning tree state. Referring also to FIG. 6, a first bit 706 of the table entry 702 constitutes a MASK bit signal that is provided to OR gate 616 of the decoder 610 along with a port select signal on line 626 from the LTL 550. When asserted ("low"), the MASK bit blocks the port select signal, thereby forcing the SAINT 300 to discard the current frame.

The MASK bit is further provided to OR gate 614 along with a bus grant signal on line 624 from the local arbiter 250. The bus grant signal indicates whether the port is the source of the current frame. The output of this latter gate 614 is a FLUSH signal which is transmitted over the bus 210 to all ports of the switch; when asserted, the FLUSH signal directs the ports to discard the current frame. A second bit 708 of the table entry 702 is coupled to an input of OR gate 612 which, together with the bus grant signal on line 624, form an ABORT signal at the output of the gate 612. The ABORT signal is provided to EARL 500 which, in response to assertion of this signal, aborts the learning phase of its operation.

As noted, these control signals are provided to the forwarding engine and port interface circuitry to, inter alia, implement the spanning tree states with respect to a current frame and a particular port of the switch. For example, in the forwarding state, none of the control signals are asserted and the current frame is transferred normally throughout the switch. In the learning state, the MASK signal is asserted if the frame is not a BPDU frame, whereas both the MASK and FLUSH signals are asserted if the port is the source port of the frame and the frame is not a BPDU frame. If the frame is a BPDU frame (as indicated by the state of the BPDU bit of field 416), none of the signals are asserted. The MASK signal prevents the current frame from being sent to a network entity where the frame originated from another, non-blocked port and the FLUSH signal is asserted to prevent forwarding of the frame from the port to the network. When in the learning state, EARL learns the sources of the frame in its normal manner.

For the blocking state, the MASK signal is asserted if the frame is normal, and the FLUSH and ABORT signals are asserted when the port is the source of the frame (i.e., the bus grant signal from the local arbiter is asserted). If the frame is a BPDU frame, none of the control signals are asserted. When asserted, the MASK signal prevents a normal frame transmitted from another port in the switch from being sent to the network, whereas assertion of the FLUSH and ABORT signals prevents a normal frame from being forwarded by the port to other ports of the switch and prevents EARL from learning the source of the frame. In this state, a BPDU frame is not affected by the CBL mechanism; any decision not to send this frame to the network is made by the processor.

The listening state is implemented in a manner similar to the blocking state. On the other hand, the disabling state is implemented by asserting the MASK signal for the frame, thereby preventing the port from sending any frame to the network, and by asserting the FLUSH and ABORT signals if the port is the source of the frame; this prevents the port from forwarding the frame to any other port. Assertion of these latter control signals also prevent EARL from learning the source of the frame.

While there has been shown and described an illustrative embodiment for implementing spanning tree states with respect to data frames transported between port interface circuitry over a link connecting different switches in a network using a novel CBL mechanism, it is to be understood that various other adaptations and modifications may be made within the spirit and scope of the invention. For example, in an alternate embodiment of the invention, the BPDU frame can be substituted for a proprietary discovery protocol (PDP) frame used to develop the topology of a network; use of this frame (and related bit) would proceed in a manner similar to that described in the illustrative embodiment. In addition, the CBL mechanism may be extended to support any type of traffic, such as asynchronous transfer mode (ATM) traffic, as long as the relevant port interface circuitry supports multiple VLANs.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A mechanism for dynamically implementing spanning tree states with respect to data frames transported over a bus to port interface circuitry connecting a plurality of switches in a network via a link, the port interface circuitry supporting multiple virtual local area network (VLAN) designations, the mechanism comprising:

a memory table having a plurality of entries, each entry containing a binary-encoded value representing a predetermined spanning tree state of the port interface circuitry for each VLAN designation;

a state machine coupled between the bus and the memory table, the state machine extracting certain information from a current data frame and manipulating that information to form an address for accessing the memory table; and a port state decoder coupled to memory table for receiving the binary-encoded value addressed by the manipulated information, the decoder generating control signals corresponding to the predetermined spanning tree state in response to the binary-encoded value, whereby the control signals are provided to the port interface circuitry to implement the predetermined spanning tree state with respect to the current data frame.

2. The mechanism of claim 1 wherein the certain information comprises the contents of (i) a color field of the current data frame and (ii) a bridge protocol data unit (BPDU) field of the current data frame, and wherein the contents of the color and BPDU fields are concatentated to form the address.

3. The mechanism of claim 1 wherein the predetermined spanning tree state is one of a forwarding, learning, blocking, listening and disabling state.

4. The mechanism of claim 2 wherein the memory table is effectively divided into two halves by the contents of the BPDU field such that the binary-encoded value comprises the contents of a memory table entry from each half of the table.

5. The mechanism of claim 4 wherein the contents of each memory table entry comprises a first bit and a second bit.

6. The mechanism of claim 5 wherein the port state decoder comprises an arrangement of logic gates responsive to the first and second bits of each memory table entry.

7. The mechanism of claim 6 wherein the logic gates are OR gates.

8. Apparatus for dynamically implementing a spanning tree state with respect to a data frame transported over a switching bus to a plurality of network switches via a link, the apparatus comprising:

port interface circuitry coupled between the switching bus and link, the port interface circuitry supporting multiple virtual local area network (VLAN) designations;

a forwarding engine comprising (i) an address recognition logic circuit, coupled to the switching bus, for executing forwarding operations for the data frame transported over the switching bus and (ii) a target logic circuit, coupled to the port interface circuitry, for implementing those forwarding operations; and means, cooperatively coupled to the target logic circuit, for selectively enabling the port interface circuitry to one of receive and discard the data frame to thereby implement the spanning tree state with respect to the data frame.

9. The apparatus of claim 8 wherein the selectively enabling means comprises a memory table having a plurality of entries, each containing a binary-encoded value representing a spanning tree state of the port interface circuitry for each VLAN designation.

10. The apparatus of claim 9 wherein the selectively enabling means further comprises a state machine coupled between the switching bus and the memory table, the state machine extracting certain information from the data frame and manipulating that information to form an address for accessing the memory table.

11. The apparatus of claim 10 wherein the selectively enabling means further comprises a port state decoder coupled to memory table for receiving the binary-encoded value addressed by the manipulated information, the decoder generating control signals corresponding to the spanning tree state in response to the binary-encoded value.

12. The apparatus of claim 11 wherein the contents of each memory table entry comprises a plurality of bits.

13. The apparatus of claim 12 wherein the port state decoder comprises an arrangement of logic gates responsive to the table entry bits.

14. The apparatus of claim 13 wherein one of the table entry bits is a mask bit that is provided to one of the logic gates along with a port select signal from the target logic circuit, and wherein the mask bit, when asserted, blocks the port select signal thereby forcing the port interface circuitry to discard the data frame.

15. The apparatus of claim 13 further comprising a local arbiter coupled to the port interface circuitry, the local arbiter generating a bus grant signal in response to the port interface circuitry successfully arbitrating for the switching bus.

16. The apparatus of claim 15 wherein one of the table entry bits is a mask bit that is provided to one of the logic gates along with the bus grant signal from the local arbiter, and wherein the output of the one logic gate is a flush signal that, when asserted, directs the port interface circuitry to discard the data frame.

17. The apparatus of claim 15 wherein one of the table entry bits is provided to one of the logic gates along with the bus grant signal from the local arbiter, and wherein the output of the one logic gate is an abort signal that, when asserted, aborts an operation of the forwarding engine.

18. A method for dynamically implementing a spanning tree state with respect to a data frame transported over a switching bus to port interface circuitry connecting a plurality of network switches via a link, the port interface circuitry supporting multiple virtual local area network (VLAN) designations, the method comprising the steps of:

A. executing forwarding operations for the data frame at an address recognition logic circuit of a forwarding engine;

B. implementing those forwarding operations with the port interface circuitry coupled to a target logic circuit of the forwarding engine;

C. selectively enabling the port interface circuitry to one of receive and discard the data frame using a color blocking logic (CBL) circuit cooperatively coupled to the target logic circuit to thereby implement the spanning tree state with respect to the data frame.

19. The method of claim 18 wherein step C comprises the steps of:

C1. extracting certain information from the data frame using a state machine of the CBL circuit; and C2. manipulating the certain information to form an address for accessing a memory table of the CBL circuit, the memory table having a plurality of entries, each containing a binary-encoded value representing a spanning tree state of the port interface circuitry for each VLAN designation.

20. The method of claim 19 wherein step C further comprises the steps of:

C3. providing the binary-encoded value addressed by the manipulated information from the memory table to a port state decoder of the CBL circuit; and C4. generating control signals corresponding to the spanning tree state at the port state decoder in response to the binary-encoded value.

* * * * *